Figure 1:
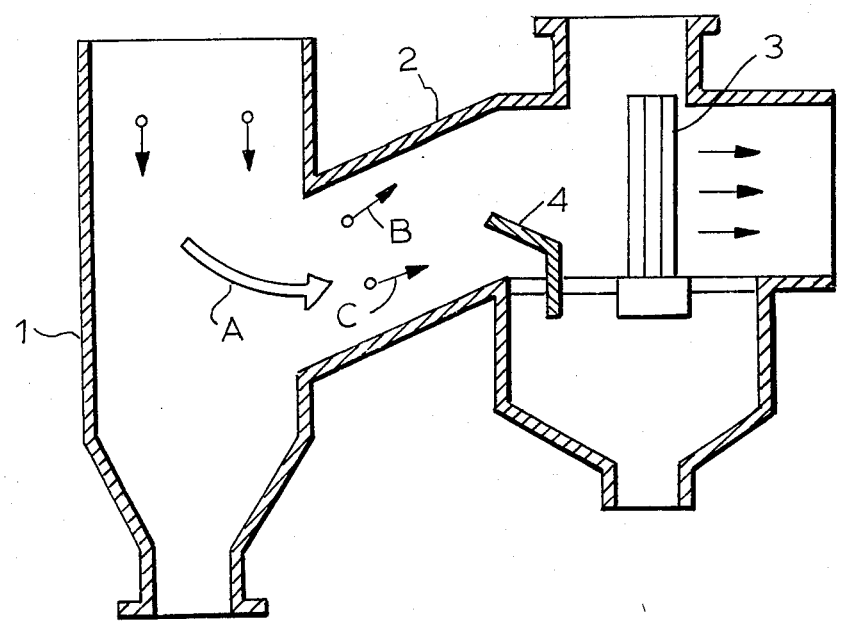

United States Patent [19]

Kimishima et al.

[11] 4,257,793
[45] Mar. 24, 1981

[54] APPARATUS FOR REMOVING MIST OR THE LIKE FROM A GAS FLOW

[75] Inventors: Makoto Kimishima, Tokyo; Naoharu Shinoda, Hiroshima, both of Japan

[73] Assignee: Mitsubishi Jukogyo Kabushiki Kaisha, Tokyo, Japan

[21] Appl. No.: 54,568

[22] Filed: Jul. 3, 1979

[30] Foreign Application Priority Data

Jul. 11, 1978 [JP] Japan .................. 53-95302[U]

[51] Int. Cl.³ .................. B01D 45/16; B01D 45/08
[52] U.S. Cl. ........................... 55/394; 55/426; 55/461; 55/465
[58] Field of Search ............... 55/325, 394, 426, 440, 55/461, 462, 465, DIG. 14

[56] References Cited

U.S. PATENT DOCUMENTS

| 1,248,054 | 11/1917 | Armstrong | 55/465 |
| 2,059,814 | 11/1936 | Schneider et al. | 55/461 |
| 3,039,255 | 6/1962 | Van Der Meer | 55/461 |

FOREIGN PATENT DOCUMENTS

| 462797 | 2/1914 | France | 55/461 |
| 1088435 | 3/1955 | France | 55/461 |
| 178262 | 4/1922 | United Kingdom | 55/440 |

Primary Examiner—David L. Lacey
Attorney, Agent, or Firm—Wenderoth, Lind & Ponack

[57] ABSTRACT

An improved apparatus for removing mist or the like from a gas flow is described herein, in which a gas flow is introduced from a main duct into a lateral duct that is connected to the downstream end of the main duct and which extends in a different direction from the main duct to thereby cause mist, dust or the like in the gas flow to deviate within the lateral duct, a remover plate for mist, dust or the like is disposed in the region just downstream of the junction between the main duct and the lateral duct into which the mist, dust or the like in the gas flow has flowed, and a mist eliminator is provided downstream of the remover plate.

4 Claims, 4 Drawing Figures

APPARATUS FOR REMOVING MIST OR THE LIKE FROM A GAS FLOW The present invention relates to improvements in an apparatus for removing mist or the like from a gas flow.

Heretofore, in a desulfurizing apparatus for exhaust smoke from a lime-gypsum process, capture and collection of mist and solid components carried by the gas flow have been effected by means of the conventional corrugated plate collision type eliminator making use of inertial force.

However, since washing of the aforementioned corrugated plate collision type eliminator is not always achieved effectively, during continuous operation of the apparatus solid components in the gas flow gradually adhere to and accumulate on the eliminator as a deposit, resulting in increase of fluid resistance of the eliminator, and often this leads to resputtering of the adhered deposit.

Therefore, it is one object of the present invention to provide an improved apparatus for removing mist or the like from a gas flow, which is free from the disadvantage of the corrugated plate collision type eliminator in the prior art apparatus.

Another object of the present invention is to provide an improved apparatus for removing mist or the like from a gas flow, in which the disadvantage of the prior art apparatus is obviated without increasing pressure loss due to the gas flow across the apparatus.

According to one feature of the present invention, there is provided an apparatus for removing mist or the like from a gas flow, comprising a main duct, a lateral duct connected to the downstream end of said main duct and directed in a direction different from that of said main duct so that when the gas flow is introduced into the lateral duct from said main duct the mist or the like contained in the gas flow will deviate within the lateral duct, a remover plate for the mist or the like disposed in the region just downstream of the junction between said main duct and said lateral duct where the mist or the like contained in the gas flow has flowed, and a mist eliminator provided downstream of said remover plate.

According to another feature of the present invention, there is provided the above described apparatus in which said lateral duct is connected to said main duct at an angle of at least 90 degrees, whereby the separation of the mist or the like in the gas flow can be made more effective and the capture and collection of the mist or the like by means of the remover plate can be enhanced.

It has been well known that provision of a structure such as a remover plate within a duct would generally result in increase of pressure loss caused by collision of the gas flow therewith. In an apparatus for processing a large amount of gas such as an exhaust smoke desulfurizing apparatus, increase of pressure loss in a gas flow causes a direct increase of the power consumption of the gas fan, and hence it is very disadvantageous from the standpoint of economy.

Accordingly, a remover plate to be provided for the purpose of capturing and collecting mist and solid components carried by a gas flow should preferably cause a minimum pressure loss. In this connection, the inventors of this invention have discovered that after a gas flow has passed a bend between the main duct and the lateral duct, the gas flow as well as the mist and solid components carried by the gas flow will deviate within the lateral duct toward the radially outward side of the bend due to the inertial force (i.e. the centrifugal force) and also in the downward direction due to a gravity, and that most of the mist and solid components carried by the gas flow are confined within the region between the position where the flow speed is about ⅓ of the highest flow speed and the side and/or bottom wall toward which the gas flow deviates within the lateral duct.

According to still another feature of the present invention, on the basis of the aforementioned discovery there is provided the above-described apparatus in which said remover plate extends from the side and/or bottom wall toward which the gas flow deviates to the position where the flow speed of the gas flow falls to about ⅓ of the highest flow speed in the flow speed distribution in the cross-section of the lateral duct where said remover plate is disposed.

Due to the aforementioned size and positioning of the remover plate, the mist and solid components carried by the gas flow will be effectively captured and collected while the pressure loss in the gas flow caused by the provision of the remover plate will be kept to a minimum.

Figure 4:
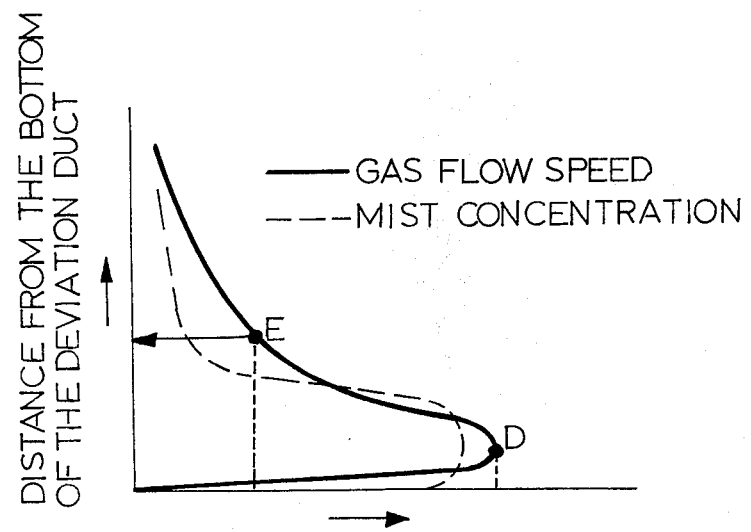
Figure 2:
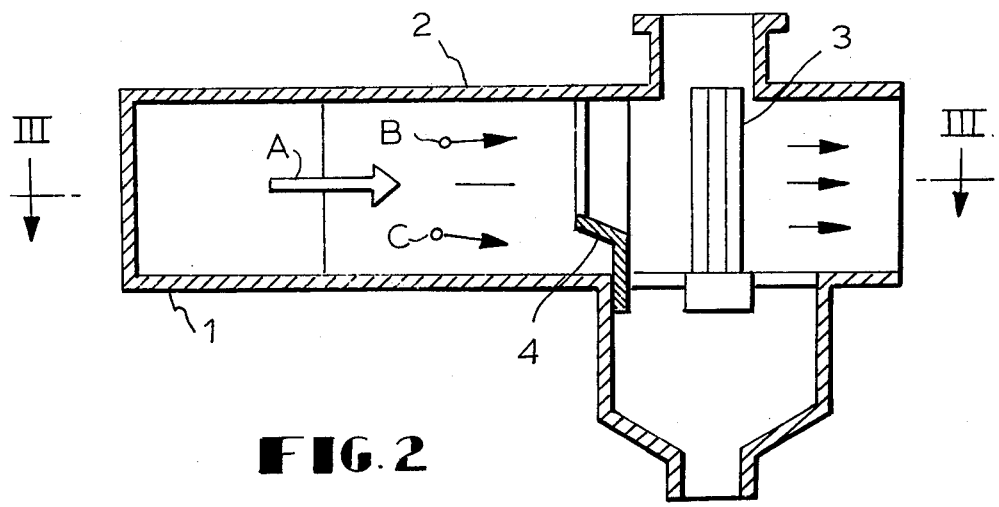
Figure 3:
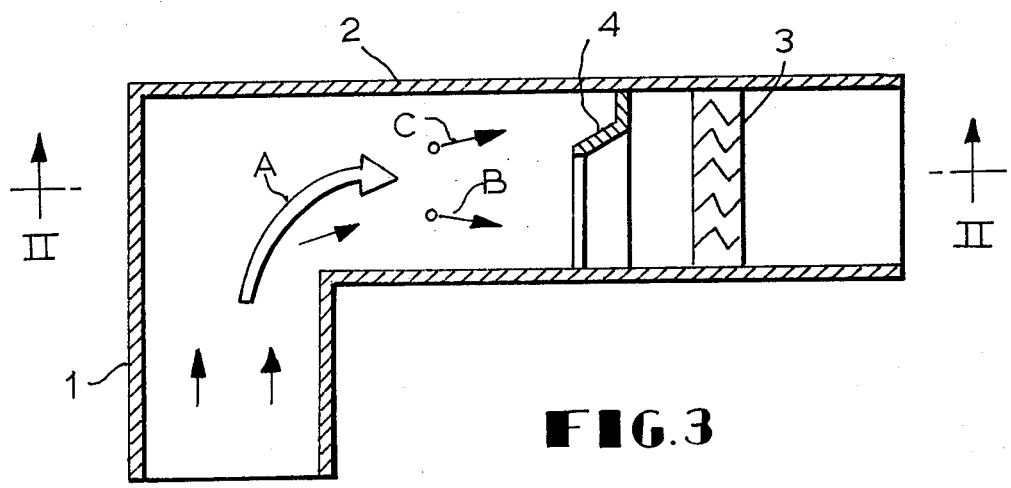

The above-described and other features and objects of the present invention will become more apparent by reference to the following description of its preferred embodiments taken in conjunction with the accompanying drawings, in which:

FIG. 1 is a schematic vertical cross-section view of one preferred embodiment of an apparatus for removing mist or the like from a gas flow according to the present invention, FIG. 2 is a schematic vertical cross-section view of another preferred embodiment of an apparatus for removing mist or the like from a gas flow according to the present invention, FIG. 3 is a schematic horizontal cross-section view of the apparatus shown in FIG. 2, and FIG. 4 is a diagram showing experimentally measured valves in a distribution of gas flow speed and mist concentration at a transverse cross-section of the lateral duct in the apparatus shown in FIG. 1 as measured with the remover plate (4) omitted.

A first preferred embodiment of the present invention in which a gas flow is diverted in direction within a vertical plane is illustrated in FIG. 1. In this figure, a lateral duct (2) connected to the downstream end of a main duct (1) is directed in such direction that the direction of the gas flow A is diverted through a deflection angle of at least 90 degrees. Within the lateral duct (2) is disposed a well-known corrugated plate collision type mist eliminator (3), and a mist remover plate (4) according to the present invention is provided on the bottom wall of the lateral duct (2) upstream of the mist eliminator (3).

In this preferred embodiment, inertial force and gravity acting upon the mist or solid components carried by the gas flow which is diverted in the direction as shown by an arrow A both serve to make the mist and solid components deviate towards the bottom wall of the lateral duct (2) as shown by the arrow C, and hence, the remover plate (4) provided along the bottom wall of the lateral duct (2) can effectively capture and collect the mist and solid components while allowing most of the gas flow as shown by the arrow B to freely pass through the lateral duct (2) without being impeded by the remover plate (4). Therefore, the pressure loss caused by the provision of the remover plate (4) can be kept to a minimum.

A second preferred embodiment of the present invention in which the gas flow is diverted in a direction within a horizontal plane is illustrated in FIGS. 2 and 3. In these figures, a lateral duct connected to a downstream end of a main duct (1) extends in the horizontal direction at right angles to the direction of the horizontal main duct (1), a well-known corrugated plate collision type mist eliminator (3) is disposed within the lateral duct (2), and a mist remover plate (4) according to the present invention is provided on the bottom wall as well as the side wall that is contiguous to the radially outer wall of the bend between the main duct (1) and the lateral duct (2), upstream of the mist eliminator (3) within the lateral duct (2).

In the second preferred embodiment, the gas flow carrying mist and solid components will flow from the main duct (1) into the lateral duct (2) as shown by its arrow A, and after the gas flow has been diverted 90 degrees through the bend between the ducts (1) and (2), while most of the gas itself flows in the direction shown by the arrow B, the mist and solid components carried by the gas flow and having a larger specific gravity will deviate towards the side wall (as shown by the arrow C in FIG. 3) due to inertial force, i.e., centrifugal force and towards the bottom wall (as shown by the arrow C in FIG. 2) due to gravity, and hence, the remover plate (4) provided along the outer side wall and the bottom wall of the lateral duct (2) can effectively capture and collect the mist and solid components while allowing most of the gas flow as shown by the arrow B to freely pass through the lateral duct (2) without being impeded by the remover plate (4). Therefore, the pressure loss caused by the provision of the remover plate can be kept to a minimum. In addition, the residual mist and solid components which have not been captured and collected by the remover plate (4), are almost completely captured and collected by means of the known mist eliminator (3).

FIG. 4 shows one example of the result of experimental measurement of gas flow speed distribution and mist concentration distribution as measured at a cross-section of the deviation duct (2) in FIG. 1 with the remover plate (4) omitted. In this diagram, the gas flow speed and mist concentration are taken along the abscissa, while the distance from the bottom wall of the lateral duct downstream of the bend is taken along the ordinate. The solid line represents the distribution of the gas flow speed, whereas the dashed line represents the distribution of the mist concentration, D representing the distance of the point where the highest flow speed appears, and E representing the distance of the point where the gas flow speed is $\frac{1}{3}$ of the highest value at the point D. It is to be noted that the distribution of the flow speed and mist concentration illustrated in FIG. 4 is that for the case where the remover plate (4) is omitted from the construction shown in FIG. 1.

From FIG. 4 it can be easily seen that in the region where the gas flow speed is lower than $\frac{1}{3}$ of the highest flow speed, i.e., the flow speed at the point D, the mist concentration in the gas flow is very low, whereas the mist concentration in the gas flow is abruptly increased in the proximity of the bottom wall of the duct (2) where the gas flow speed is higher than $\frac{1}{3}$ of the highest flow speed.

Accordingly, if the remover plate (4) is provided along the bottom wall of the deviation duct (2) so that the remover plate (4) will extend up to the point where the gas flow speed has a value of about $\frac{1}{3}$ of the highest flow speed, then most of the mist and solid components carried by the gas flow can be effectively captured and collected without a substantial pressure loss in the gas flow.

As will be apparent from the above description of the preferred embodiments of the present invention, the present invention provides an inherent advantage that the pressure loss in the gas flow can be kept to a minimum, while the mist and solid components carried by the gas flow can be effectively captured and collected, and thereby a stable operation over a long period of the mist eliminator (3) can be assured.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An apparatus for removing mist and the like from a gas flow, comprising a main duct and a lateral duct connected to the downstream end of said main duct extending in a direction different from that of said main duct for causing mist and the like in flowing gas introduced into the lateral duct from said main duct to deviate within the lateral duct toward the outer wall of the lateral duct extending from the radially outer part of the bend between the main duct and the lateral duct, a remover plate in said lateral duct on at least the outer wall of said lateral duct downstream of the bend between said main duct and said lateral duct at a position where a large portion of the mist and the like contained in the gas flow has moved close to the outer wall of the lateral duct for diverting the mist and the like out of the gas flow, said remover plate extending from the outer wall in a direction transversely of the lateral duct to the position where the flow of speed of the gas flow falls to about $\frac{1}{3}$ of the highest flow speed in the flow speed distribution in a cross-section of the lateral duct at the position of said remover plate, and a mist eliminator in said lateral duct downstream of said remover plate.

2. An apparatus as claimed in claim 1, in which said lateral duct extends from said main duct at an angle of at least 90 degrees.

3. An apparatus as claimed in claim 1, in which the main duct and the lateral duct are positioned horizontally and said mist remover plate extends peripherally of said lateral duct at least along the outer wall of said lateral duct.

4. An apparatus as claimed in claim 1, in which said main duct and said lateral duct are positioned horizontally and said mist remover plate extends from the outer wall and the bottom wall of said lateral duct.

* * * * *